United States Patent
Woutters et al.

(10) Patent No.: US 9,102,795 B2
(45) Date of Patent: Aug. 11, 2015

(54) PROCESS FOR MAKING POLYUREA PARTICLES

(75) Inventors: Steve Andre Woutters, Deurne (BE); Chris Ian Lindsay, Tervuren (BE)

(73) Assignee: Huntsman International LLC, The Woodlands, TX (US)

( * ) Notice: Subject to any disclaimer, the term of this patent is extended or adjusted under 35 U.S.C. 154(b) by 136 days.

(21) Appl. No.: 13/979,151

(22) PCT Filed: Dec. 15, 2011

(86) PCT No.: PCT/EP2011/072899
§ 371 (c)(1),
(2), (4) Date: Jul. 11, 2013

(87) PCT Pub. No.: WO2012/095236
PCT Pub. Date: Jul. 19, 2012

(65) Prior Publication Data
US 2013/0281584 A1    Oct. 24, 2013

(30) Foreign Application Priority Data
Jan. 13, 2011   (EP) ..................... 11150833

(51) Int. Cl.
| | | |
|---|---|---|
| *C08G 18/08* | (2006.01) |
| *C08G 67/02* | (2006.01) |
| *C07C 275/00* | (2006.01) |
| *C08G 18/10* | (2006.01) |
| *C08G 71/02* | (2006.01) |
| *C08G 18/28* | (2006.01) |
| *C08G 18/32* | (2006.01) |

(52) U.S. Cl.
CPC ............ *C08G 71/02* (2013.01); *C08G 18/0852* (2013.01); *C08G 18/2865* (2013.01); *C08G 18/3228* (2013.01)

(58) Field of Classification Search
None
See application file for complete search history.

(56) References Cited

U.S. PATENT DOCUMENTS

| 3,728,301 A | 4/1973 | Spence et al. |
| 2006/0052261 A1* | 3/2006 | Kray et al. ................. 508/552 |
| 2006/0128885 A1 | 6/2006 | Rische et al. |

FOREIGN PATENT DOCUMENTS

DE    102004044878 A1    3/2006

* cited by examiner

*Primary Examiner* — Susannah Chung
*Assistant Examiner* — Robert T Butcher
(74) *Attorney, Agent, or Firm* — Robert A. Diaz

(57) ABSTRACT

A method for providing urea particles in a solvent medium, said method comprising at least the steps of:
providing at least one polyisocyanate component dissolved in a first solvent;
providing at least one isocyanate-reactive polyamine component dissolved in a second solvent;
providing at least one isocyanate-reactive monoamine, optionally dissolved in a third solvent;
combining and reacting said isocyanate-reactive monoamine optionally dissolved in said third solvent with said polyisocyanate dissolved in said first solvent, thereby providing an urea-modified polyisocyanate dissolved in said first solvent and said optionally third solvent, and then
combining and reacting said urea-modified polyisocyanate dissolved in said first solvent and said optionally third solvent with said polyamine component dissolved in said second solvent.

14 Claims, No Drawings

PROCESS FOR MAKING POLYUREA PARTICLES

CROSS-REFERENCE TO RELATED APPLICATIONS

This application is the National Phase of International Application PCT/EP2011/072899 filed Dec. 15, 2011 which designated the U.S. and which claims priority to European App. Serial No. 11150833.9 filed Jan. 13, 2011. The noted applications are incorporated herein by reference.

The present invention relates to a method to produce fine polyurea particles, optionally micron size or nano-particles, and to fine polyurea particles, optionally micron size or nano-particles.

In prior art, several methods are disclosed to make polyurethane/polyurea particles, in particular polyurethane/polyurea nano-particles. As an example, US2006/0128885A1 discloses a method to make polyurethane-polyurea particles having two discrete maxima in the particle size distribution, consisting of at least two discrete steps, performed in batch mode. In a first step, amines carried in water are added to a prepolymer, i.e. the reaction product of polyisocyanate and a polyol, which polyisocyanate is carried in acetone. After the initial reaction, water is added to complete the forming of polyurethane-polyurea particles. In a further step, the large amount of acetone is to be evaporated.

It is an object of the present invention to provide a method for providing polyurea particles which process is more cost efficient and can be practiced as a continuous process.

The above objective is accomplished by method according to the present invention.

According to a first aspect of the present invention a method for providing urea particles in a solvent medium is provided. The method comprises the steps of
  providing at least one polyisocyanate component dissolved in a first solvent;
  providing at least one isocyanate-reactive polyamine component dissolved in a second solvent;
  providing at least one isocyanate-reactive monoamine, optionally dissolved in a third solvent;
  reacting the polyisocyanate component, the polyamine component and the monoamine, by combining the polyisocyanate component dissolved in the first solvent, the polyamine component dissolved in the second solvent and the monoamine optionally dissolved in the third solvent, thereby providing urea particles dispersed in a solvent medium, the solvent medium comprising said first solvent, the second solvent and optionally the third solvent,
  whereby the monoamine is a monoamine soluble in the solvent medium The monoamine soluble in the solvent medium is understood as soluble at least at a temperature equal to the temperature during the reaction, but preferably the monoamine is soluble in the solvent medium at room temperature, i.e. 20 deg C.

The particles obtained may have very small dimensions, e.g. in the range of 50 nm to 10 µm, optionally in the range of 50 nm to 5 µm, such as in the range of 50 nm to 1 µm. Preferably the particles have an equivalent diameter of only 50 to 700 nm, e.g. in the range of 100 nm to 700 nm, more preferred between 100 nm and 250 nm. Equivalent diameter means the imaginary diameter of an imaginary sphere, which sphere has the same volume as the volume of the particle under consideration.

The particles have in essence no urethane bonds in the structure.

The obtained dispersion can be kept stable at normal storage circumstances, e.g. at room temperature, for a longer period of time.

To prepare the particles and the dispersion comprising said particles, the necessity of energy input, e.g. by means of ultrasonication, high shear mixing, pressure in crease and/or heating can be minimized, even avoided.

The particles may have higher thermal stability compared to particles having bonds being substantially consisting of urethane bonds. They exhibit higher melting points and higher glass transition temperatures. This translates in a high hardness in a wide temperature range, which itself may be a useful property in applications such as reinforcing filler.

The choice of suitable isocyanate, polyamine and monoamine, is wide, facilitating to produce a wide range of particles using substantially the same process.

According to some embodiments of the present invention, reacting the polyisocyanate component, the polyamine component and the monoamine may comprise
  combining and reacting said isocyanate-reactive monoamine optionally dissolved in the third solvent with said polyisocyanate dissolved in the first solvent, thereby providing an urea-modified polyisocyanate dissolved in the first solvent and the optionally third solvent, and
  in a subsequent step combining and reacting the urea-modified polyisocyanate dissolved in the first solvent and the optionally third solvent with the polyamine component dissolved in the second solvent.

The urea-modified polyisocyanate hence is dissolved in the first solvent in case there is no third solvent used, or in the combination of the first and third solvent in case there is a third solvent used.

According to some embodiments of the present invention, reacting the polyisocyanate component, the polyamine component and the monoamine may comprise
  combining the isocyanate-reactive monoamine optionally dissolved in the third solvent with said polyamine component dissolved in the second solvent, thereby providing an amine mixture dissolved in the second solvent and the optionally third solvent, and
  in a subsequent step combining and reacting the polyisocyanate dissolved in the first solvent with the amine mixture dissolved in the second solvent and optionally the third solvent.

The amine mixture hence is dissolved in the second solvent in case no third solvent is used or in the combination of the second and third solvent in case a third solvent is used.

According to some embodiments of the present invention, the first and the second solvent may be identical.

According to some embodiments of the present invention, the isocyanate-reactive monoamine may be dissolved in a third solvent.

The provision of this monoamine in a third solvent is preferred in case the monoamine is reacted with the polyisocyanate prior to reacting the resulting urea-modified polyisocyanate with the polyamine.

According to some embodiments of the present invention, the third solvent may be identical to the first solvent.

The provision of this monoamine in a third solvent identical to the first solvent is preferred in case the monoamine is reacted with the polyisocyanate prior to reacting the resulting urea-modified polyisocyanate with the polyamine.

According to some embodiments of the present invention, the third solvent may be identical to the second solvent.

According to some embodiments of the present invention, the first solvent may be a ketone, e.g. acetone.

According to some embodiments of the present invention, the first solvent may be tetrahydrofuran (THF).

According to some embodiments of the present invention, the first solvent may be toluene.

According to some embodiments of the present invention, the first solvent may be a polyol.

According to some embodiments of the present invention, the second solvent may be water.

According to some embodiments of the present invention, the second solvent may be a polyol.

According to some embodiments of the present invention, the first and the second solvent may be identical.

According to some embodiments of the present invention, the first and said second solvent may be polyols, optionally identical polyol.

The provision of this monoamine in a third solvent identical to the second solvent is preferred in case the monoamine is combined with the polyamine in the second solvent, prior to reaction of the polyisocyanate with the mono- and polyamine.

The first, second and the optionally third solvent are understood to be liquid solvents. The first, second and third solvent preferably comprises only one solvent components, optionally comprising traces of typical impurities.

With liquid is meant that the solvent can be present in liquid state in at least part of the temperature range wherein the reaction is to be performed, e.g. preferably in the temperature range between −30° C. and 60° C., all at ambient pressure (100 kPa). Preferably the first and second solvent are well soluble one into the other. The volumes of the first and second solvent may be chosen such that no saturation levels are met. Preferably the first and second solvent are miscible, i.e. one solvent can be mixed with the other solvent or solvents in any ratio.

In case of the use of a third solvent, the third, the first and second solvent are well soluble one into the other. The volumes of the first, second and third solvent may be chosen such that no saturation levels are met. Preferably the first, second and third solvent are miscible, i.e. one solvent can be mixed with the other solvent or solvents in any ratio.

According to some embodiments of the present invention, the second solvent may be water. This water may be demineralized water.

When, during the process, the polyamine and the monoamine are reacted with the polyisocyanate component simultaneously, the second and third component may be identical, e.g. water.

The second solvent may be inert to isocyanate, though may as well be isocyanate reactive. The second solvent can be of protonic or non-protonic nature. Suitable solvents are non-protonic solvents such as e.g. acetone, 2-butanone, diethylether, tetrahydrofuran (also referred to as THF), methylethylketone, ethylacetate, pyridine, dioxane, 1,2-dimethoxyethane (also known as glyme or DME) and diethylene glycol dimethyl ether (also known as diglyme), acetonitrile, toluene, dimethylacetamide (also referred to as DMAC), dimethylformamide (also referred to as DMF), dimethyl sulfoxide (also referred to as DMSO). The second solvent may be of protonic nature, e.g. water.

Optionally, the second solvent may be a polyol. As an example, the second solvent may be polyol or a polyol mixture having average hydroxyl numbers of from 20 to 300, especially from 25 to 150 mg KOH/g, and hydroxyl functionalities of from 1.5 to 3, especially from 1.8 to 2.2, and a MW generally from 750 to 6000. Suitable polyols include reaction products of alkylene oxides, for example ethylene oxide and/or propylene oxide, with initiators containing from 2 to 8 active hydrogen atoms per molecule. Suitable initiators include: polyols, for example glycerol, trimethylolpropane, triethanolamine, pentaerythritol, sorbitol and sucrose; polyamines, for example ethylene diamine, tolylene diamine (TDA), diaminodiphenylmethane (DADPM) and polymethylene polyphenylene polyamines; and aminoalcohols, for example ethanolamine and diethanolamine; and mixtures of such initiators. Other suitable polyols include polyesters obtained by the condensation of appropriate proportions of glycols and higher functionality polyols with dicarboxylic or polycarboxylic acids. Still further suitable polymeric polyols include hydroxyl terminated polythioethers, polyamides, polyesteramides, polycarbonates, polyacetals, polyolefins and polysiloxanes. Mixtures may be used.

The second solvent medium may be a solvent in which the polyisocyanate component solves poorly, if soluble at all.

The third solvent medium, if used, is suitable to dissolve the at least one isocyanate-reactive monoamine.

In case the monoamine and the polyisocyanate are reacted first, prior to reaction with the polyamine, this third solvent medium is preferably suitable to dissolve the polyisocyanate.

According to some embodiments of the present invention, the first solvent medium, or one or more of the solvent components of this first solvent medium, may be a ketone. The ketone may be acetone. Alternatively the first solvent may be any other suitable organic solvent such as THF (tetrahydrofuran). Toluene can be used as well.

Alternatively, the first solvent may be a polyol. As an example, the first solvent may be polyol or a polyol mixture having average hydroxyl numbers of from 20 to 300, especially from 25 to 150 mg KOH/g, and hydroxyl functionalities of from 1.5 to 3, especially from 1.8 to 2.2, and a MW generally from 750 to 6000. Suitable polyols include reaction products of alkylene oxides, for example ethylene oxide and/or propylene oxide, with initiators containing from 2 to 8 active hydrogen atoms per molecule. Suitable initiators include: polyols, for example glycerol, trimethylolpropane, triethanolamine, pentaerythritol, sorbitol and sucrose; polyamines, for example ethylene diamine, tolylene diamine (TDA), diaminodiphenylmethane (DADPM) and polymethylene polyphenylene polyamines; and aminoalcohols, for example ethanolamine and diethanolamine; and mixtures of such initiators. Other suitable polyols include polyesters obtained by the condensation of appropriate proportions of glycols and higher functionality polyols with dicarboxylic or polycarboxylic acids. Still further suitable polymeric polyols include hydroxyl terminated polythioethers, polyamides, polyesteramides, polycarbonates, polyacetals, polyolefins and polysiloxanes. Mixtures may be used.

In case the first solvent is a polyol, the polyol and the isocyanate may only be reactive on to the other at temperatures above the typical process temperature used according to the present invention, hence preferably reactive one to the other at temperatures above 60° C.

According to some embodiments of the present invention, in case of use of a third solvent, the third solvent, or one or more of the solvent components of this third solvent, may be water or a polyol. Alternatively the third solvent may be any suitable organic solvent such as ketones, e.g. acetone, 2-butanone, pyridine, dioxane, 1,2-dimethoxyethane (also known as glyme or DME) and diethylene glycol dimethyl ether (also known as diglyme), acetonitrile, dimethylformamide (also referred to as DMF), dimethyl sulfoxide (also referred to as DMSO) and tetrahydrofuran (also referred to as THF). The third solvent may be a polyol, similar or identical to the polyols suitable to provide the first and/or the second solvent.

Preferably the first solvent and the second solvent do not form an azeotrope, which simplifies the purification of the components of the first and second solvent once the urea particles are formed and optionally removed. Also the combination of a first and third, a second and third or a first, second and third solvent preferably does not form an azeotrope.

Preferably the weight percentage of the polyisocyanate or polyisocyanates together in the first solvent is in the range of 0.1 to 25 wt %, more preferred in the range of 0.1 to 12 wt %.

Preferably the weight percentage of the polyamine or polyamines together in the second solvent is in the range of 1 to 25 wt % more preferred in the range of 5 to 10 wt %.

The monoamine or monoamines can be used undiluted or undissolved. In case the monoamine or monoamines are dissolved in a third solvent, the weight percentage of the monoamine or monoamines together in the third solvent is in the range of 0.01 to 65 wt % more preferred in the range of 0.01 to 50 wt %, even 0.01 to 25 wt %.

The weight ratio of the first solvent and the polyisocyanate or polyisocyanates over the second solvent and the polyamine or polyamines is may vary to a large extent.

The ratio of isocyanate groups of the polyisocyanate or polyisocyanates (referred to as ISO-groups) over the number of reactive hydrogens of the monoamine or monoamines (referred to as $H_{ma}$) is preferably in the range of 0.7 to 200, preferably in the range of 1 to 50.

The ratio of isocyanate groups of the polyisocyanate or polyisocyanates over the number of primary and secondary amine groups (i.e. the sum of the primary amines and the secondary amine groups) of the monoamine or monoamines (referred to as $N_{ma}$) is preferably in the range of 1.4 to 400, preferably in the range of 2 to 100.

The ratio of isocyanate groups of the polyisocyanate or polyisocyanates over the number of reactive hydrogens of the polyamine or polyamines (referred to as $H_{pa}$) is preferably in the range of 0.5 to 3.5, such as in the range of 0.504 to 3.5, e.g. from 0.508 to 2.0, the ranges being inclusive.

The ratio of isocyanate groups of the polyisocyanate or polyisocyanates over the number of primary and secondary amine groups (i.e. the sum of the primary amines and the secondary amine groups) of the polyamine or polyamines (referred to as $N_{pa}$) is preferably in the range of 1.0 to 7.0, such as in the range of 1.008 to 7.00, preferably in the range of 1.016 to 4.00.

Most preferably the ISO-index of the system consisting of polyisocyanate(s), monoamine(s) and polyamine(s) may be in the range of 0.2 to 2.0, such as in the range of 0.9 to 1.1.

Urea particles refer to particles in which the number of urethane bonds, as compared to the number of urea bonds, is substantially negligible.

The ratio of urethane bonds over urea bonds expresses the number of urethane bonds over the number of urea bonds per weight unit of particles.

Preferably this ratio of urethane bonds over urea bonds in the particles is less than 0.2, or even less than 0.1, even less than 0.01.

The urea bonds in the particles means the number of functional groups RR'N—CO—NRR', i.e. a carbonyl group attached to two nitrogens, present in the particles.

The urethane bonds in the particles means the number of functional groups RNH—CO—OR' present in the particles.

Suitable polyisocyanates are polyisocyanates of the type R—(NCO)$_x$ with x at least 2 and R being an aromatic or aliphatic group, such as diphenylmethane, toluene, dicyclohexylmethane, hexamethylene, or a similar polyisocyanate, and mixtures thereof.

Suitable polyisocyanates are toluene diisocyanates (TDI), diphenylmethane diisocyanate (MDI)—type isocyanates, and prepolymers of these isocyanates. Preferably the polyisocyanates may have at least two aromatic rings in its structure, and are liquid products or liquefiable at the process temperature used, i.e. liquefiable at temperatures preferably of 40 deg C or less. Polymeric isocyanates having a functionality greater than 2 may be used.

Examples of suitable polyisocyanates are tolylene diisocyanate (also known as toluene diisocyanate, and referred to as TDI), such as 2,4 TDI and 2,6 TDI in any suitable isomer mixture, hexamethylene diisocyanate (HMDI or HDI), isophorone diisocyanate (IPDI), butylene diisocyanate, trimethylhexamethylene diisocyanate, di(isocyanatocyclohexyl)methane, e.g. 4,4'-diisocyanatodicyclohexylmethane (H$_{12}$MDI), isocyanatomethyl-1,8-octane diisocyanate and tetramethylxylene diisocyanate (TMXDI), 1,5-naphtalenediisocyanate (NDI), p-phenylenediisocyanate (PPDI), 1,4-cyclohexanediisocyanate (CDI), tolidine diisocyanate (TODI), any suitable mixture of these polyisocyanates, and any suitable mixture of one or more of these polyisocyanates with MDI in the form of its 2,4'-, 2,2'- and 4,4'-isomers and mixtures thereof (also referred to as pure MDI), the mixtures of diphenylmethane diisocyanates (MDI) and oligomers thereof (known in the art as "crude" or polymeric MDI), and reaction products of polyisocyanates (e.g. polyisocyanates as set out above, and preferably MDI-based polyisocyanates), with components containing isocyanate-reactive hydrogen atoms forming polymeric polyisocyanates or so-called prepolymers. An other suitable polyisocyanate is xylenediisocyanate.

Examples of components containing isocyanate-reactive hydrogen atoms suitable to provide applicable polymeric polyisocyanates or prepolymers include alcohols, glycols or even relatively high molecular weight polyether polyols and polyester polyols, mercaptans, carboxylic acids such as polybasic acids, amines, urea and amides.

Preferably the polyisocyanates used and dissolved in the first solvent are urethane bond free, i.e. do not comprise urethane bonds.

The monoamines used in this invention are preferably are comprises primary amine groups.

Preferably the monoamines are alkylpolyoxyalkyl monoamines, in general

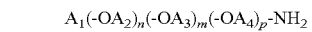

wherein

A1 typically is a C1 to C6 chain, most preferably a CH$_3$-group.

A2, A3 and A4 typically are mutually different C1 to C6 chains, most preferably at least one of them being a C2-chain, at least one being a branched C3-chain and at least one being a straight C3-chain.

N, m and p independently are a positive integers, at least one of them being more than zero.

Alternatively A1 may be C9H19-Ø-, wherein Ø is an aromatic C6-ring, e.g. Surfonamine B-100 of Huntsman International LLC.

The OA1-, OA2 and OA3- groups may be distributed randomly (random alkoxy polymers) or may be present as one or more groups (block alkoxy copolymers).

Most preferred, the monoamines are alkyl EO/PO copolymer monoamines, i.e. a copolymer of ethoxy-groups and propoxy-groups, either random or block copolymerized, which is terminated at one side of the chain by an alkyl group, typically methyl, and at the other side of the chain terminated by a primary amine group.

Typical examples are monoamines as sold by Huntsman International LLC under the name Jeffamine M-amines, such as Jeffamine M1000 and Jeffamine M 2070, Jeffamine M2005, Jeffamine M600 and Surfonamine L-300.

According to some embodiments of the invention, only one monoamine is used.

According to some embodiments of the invention, a combination of different monoamines is used. According to some embodiments of the present invention, at least one monoamine may be a primary amine group. According to other embodiments of the present invention, the at least one monoamine may be a secondary amine group.

A polyamine is a component comprising at least two amine groups.

According to some embodiments of the present invention, the at least one polyamine may comprise only primary amine groups, only secondary amine groups or both primary amine groups and secondary amine groups.

Preferably the polyamines may be amines with general structure

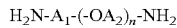

$$H_2N-A_1-(-OA_2)_n-NH_2$$

Wherein, n may be 0 or an integer from 1 till 12, e.g. 1, 2, 3, 4, 5, 6, 7, 8, 9, 10, 11 or 12. Most preferably n is an integer from 0 till 2.

If n is more than zero, A2 preferably is a C1 to C6 linear or branched aliphatic group.

A1 preferably is a C2 to C6 linear or branched aliphatic group, an aromatic group or a cycloaliphatic group.

When n is at least one, A1 preferably is a C2, C3 or branched C3 group.

The polyamines may have the structure

$$H_2N-A_1-NH-A_2-NH_2$$

wherein A1 and A2 being C2, C3 or branched C3 groups.

The polyamines may have the structure

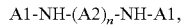

$$A1-NH-(A2)_n-NH-A1,$$

with A1 being a branched C3 and A2 being C2, C3 or branched C3. Or A2 is a group with the structure -(OB1)-, with B1 being a C2, C3 or branched C3. n can be a number ranging from 1 to 10.

Examples of suitable polyamines are Ethylenediamine, diethylenetriamine, Jeffamine EDR-104, Jeffamine EDR-148, Jeffamine EDR-176, Jeffamine SD-231, Jeffamine D-230, tricyclodecanediamine, hexamethylenediamine, neopentanediamine, diethyltoluenediamine, 4-methyl-1,2-phenylenediamine A process according to the present invention may have the steps of
A. Providing an isocyanate and dissolve it in a suitable solvent (first solvent).
B. providing a monoamine and optionally dissolve it in a suitable solvent (third solvent)
C. Providing a polyamine and dissolve it in a suitable solvent (second solvent)
D. Add the monoamine to the isocyanate solution while mixing. The speed of addition of the monoamine in the isocyanate solution, the monoamine concentration (in case of dissolved monoamine in a third solvent), the isocyanate concentration it the isocyanate solution and the mixing energy may be chosen to avoid to a large extent local high concentrations of the monoamine in the isocyanate solution. Preferably a low concentration of monoamine, high concentration of isocyanate, slow addition of the monoamine and a high mixing energy is selected.
E. Subsequently the polyamine solution is added to the reaction product of isocyanate and monoamine made in D. Again, the addition speed of adding the polyamine in the reaction mixture, the polyamine concentration in the second solvent, the isocyanate concentration in the reaction mixture and the mixing energy may be chosen to avoid to a large extent local high concentrations of the polyamine in the isocyanate solution. The most ideal conditions to achieve this are low concentration of the monoamine, high concentration of isocyanate/monoamine-adduct, slow addition of the polyamine and a high mixing energy.

The independent and dependent claims set out particular and preferred features of the invention. Features from the dependent claims may be combined with features of the independent or other dependent claims as appropriate.

The above and other characteristics, features and advantages of the present invention will become apparent from the following detailed description which illustrates, by way of example, the principles of the invention. This description is given for the sake of example only, without limiting the scope of the invention.

The present invention will be described with respect to particular embodiments.

It is to be noticed that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a device comprising means A and B" should not be limited to devices consisting only of components A and B. It means that with respect to the present invention, the only relevant components of the device are A and B.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could. Furthermore, the particular features or characteristics may be combined in any suitable manner in one or more embodiments, as would be apparent to one of ordinary skill in the art.

The following terms are provided solely to aid in the understanding of the invention.

Unless otherwise expressed, the weight percentage of a component in a composition refers to the weight of the component over the total weight of the composition in which it is present, and expressed as percentage.

Unless otherwise specified, the ranges are inclusive, i.e. the values delimiting the range are included in the range specified.

"nm" means nanometer, or $10^{-9}$ meter.
"μm" means micrometer or $10^{-6}$ meter.
In the examples under, the following product are used:
Jeffamine M-2070 being a polyether monoamine with a propyleneoxide/ethyleneoxide mol ratio of 10/31;
Jeffamine M2005 being a polyether monoamine with a propyleneoxide/ethyleneoxide mol ratio of 29/6;
Jeffamine EDR-104 being bis(aminoethyl)ether;

Daltocel F477 being glycerol initiated EO end-tipped polypropylene oxide polyol with 15% EO, a functionality of 2.4, OHv 28 mgKOH/g, and an average mole weight of 6000.

EXAMPLE 1

For solution A 1.26 g of 4,4'-diphenylmethanediisocyanate (Huntsman) was dissolved in 11.42 g of acetone. For solution B 0.50 g of bis(aminoethyl)ether (Huntsman) and 1.08 g of Jeffamine M-2070 (Huntsman) were dissolved in 38.5 g of demineralized water. The dispersions were prepared by fast addition of solution B to a stirred solution A. Particle size measurement using dynamic light scattering resulted in a cumulant average size of 258 nm.

EXAMPLE 2

For solution A 1.26 g of 4,4'-diphenylmethanediisocyanate (Huntsman) was diluted with 12.0 g of acetone. For solution B 0.50 g of bis(aminoethyl)ether (Huntsman) was diluted in 40.0 g of demineralized water. For preparation of the dispersion 1.08 g of Jeffamine M-2070 (Huntsman) was added to solution A, followed by dropwise addition of solution B. Particle size measurement using dynamic light scattering resulted in a cumulant average of 210 nm.

EXAMPLE 3

For solution A 1.26 g of 4,4'-diphenylmethanediisocyanate (Huntsman) was dissolved in 12.2 g of tetrahydrofuran. For solution B 0.50 g of bis(aminoethyl)ether (Huntsman) was dissolved in 19.5 g of THF. For solution C 1.00 g of Jeffamine M2005 (Huntsman) was dissolved in 9.0 g THF. For preparation of the dispersion solution C was first added dropwise to solution A, followed by dropwise addition of solution B. Particle size measurement using dynamic light scattering resulted in a cumulant average of 114 nm.

EXAMPLE 4

For solution A 1.262 g of 4,4'-diphenylmethanediisocyanate (Huntsman) was dissolved in 8.08 g of toluene. For solution B 2.52 g of bis(aminoethyl)ether (Huntsman) was dissolved in 10.1 g of toluene. For solution C 2.02 g of Jeffamine M2005 (Huntsman) was dissolved in 6.0 g of toluene. For preparation of the dispersion solution C was added dropwise to solution A, followed by dropwise addition of solution B. Particle size measurement using dynamic light scattering resulted in a cumulant average of 89.7 nm.

EXAMPLE 5

For solution A 2.65 g of uretonimine modified 4,4'-diphenylmethanediisocyanate (Huntsman) was dissolved in 23.85 g of a polyether polyol (Daltocel F477 from Huntsman). For solution B 2.0 g of bis(aminoethyl)ether (Huntsman) was dissolved in 8.0 g of Daltocel F477. For solution C 4.0 g of Jeffamine M2005 (Huntsman) was dissolved in 16.0 g of Daltocel F477. For preparation of the dispersion solution C was added to solution A, followed by dropwise addition of solution B. Particle size measurement using dynamic light scattering resulted in a cumulant average of 271 nm.

It is to be understood that although preferred embodiments and/or materials have been discussed for providing embodiments according to the present invention, various modifications or changes may be made without departing from the scope and spirit of this invention.

The invention claimed is:

1. A method for providing urea particles having an equivalent diameter in the range 50 nm up to 700 nm in a solvent medium, said method comprising at least the steps of
    providing at least one polyisocyanate component dissolved in a first solvent;
    providing at least one isocyanate-reactive polyamine component dissolved in a second solvent;
    providing at least one isocyanate-reactive monoamine;
    forming an urea-modified polyisocyanate dissolved in said first solvent by combining and reacting said isocyanate-reactive monoamine with said polyisocyanate dissolved in said first solvent; and then
    combining and reacting said urea-modified polyisocyanate dissolved in said first solvent with said polyamine component dissolved in said second solvent.

2. The method according to claim 1, wherein said isocyanate-reactive monoamine is dissolved in a third solvent.

3. The method according to claim 2, wherein said third solvent is identical to said first solvent.

4. The method according to claim 2, wherein said third solvent is identical to said second solvent.

5. The method according to claim 1, wherein the first solvent is a ketone.

6. The method according to claim 5, wherein the ketone is acetone.

7. The method according to claim 1, wherein the first solvent is tetrahydrofuran (THF).

8. The method according to claim 1, wherein the first solvent is a polyol.

9. The method according to claim 1, wherein the second solvent is water.

10. The method according to claim 1 wherein the second solvent is a polyol.

11. The method according to claim 1 wherein said first and said second solvent are identical.

12. The method according to claim 1, wherein said first and second solvent are polyols.

13. A method for providing urea particles having an equivalent diameter in the range 50 nm up to 700 nm in a solvent medium, the method comprising at least the steps of:
    providing at least one polyisocyanate dissolved in a first solvent at a temperature greater than 60 degrees Celsius;
    providing at least one isocyanate-reactive polyamine dissolved in a second solvent;
    providing at least one isocyanate-reactive monoamine dissolved in a third solvent, wherein the third solvent is identical to the first solvent;
    forming an urea-modified polyisocyanate dissolved in the first solvent by combining and reacting the isocyanate-reactive monoamine dissolved in the third solvent with the polyisocyanate dissolved in the first solvent; and then
    combining and reacting the urea-modified polyisocyanate dissolved in the first solvent and the third solvent with the polyamine dissolved in the second solvent.

14. The method of claim 13, wherein the third solvent is a polyol.

* * * * *